No. 617,095. Patented Jan. 3, 1899.
A. GOWER.
DRIVING GEAR FOR BICYCLES.
(Application filed Dec. 29, 1897.)
(No Model.) 2 Sheets—Sheet 2.
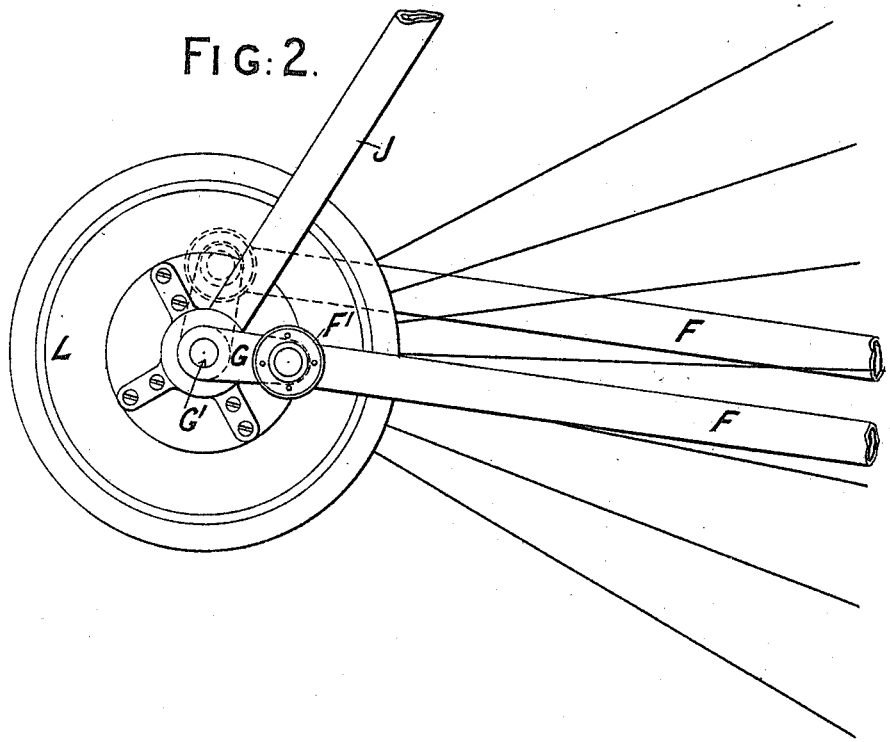
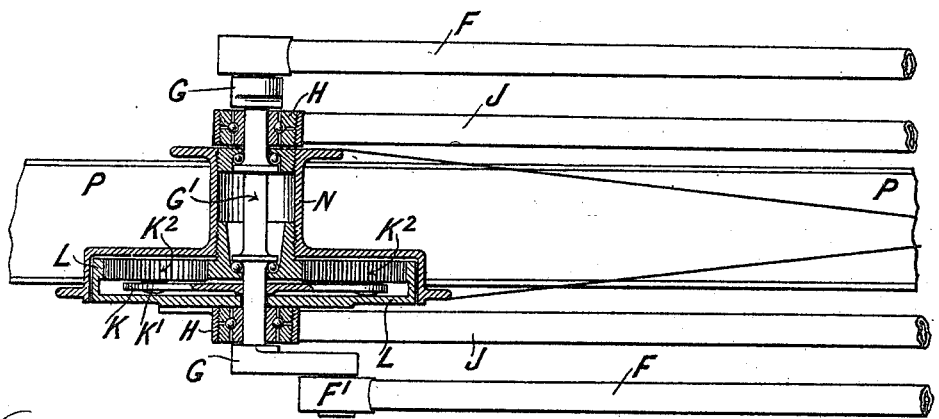

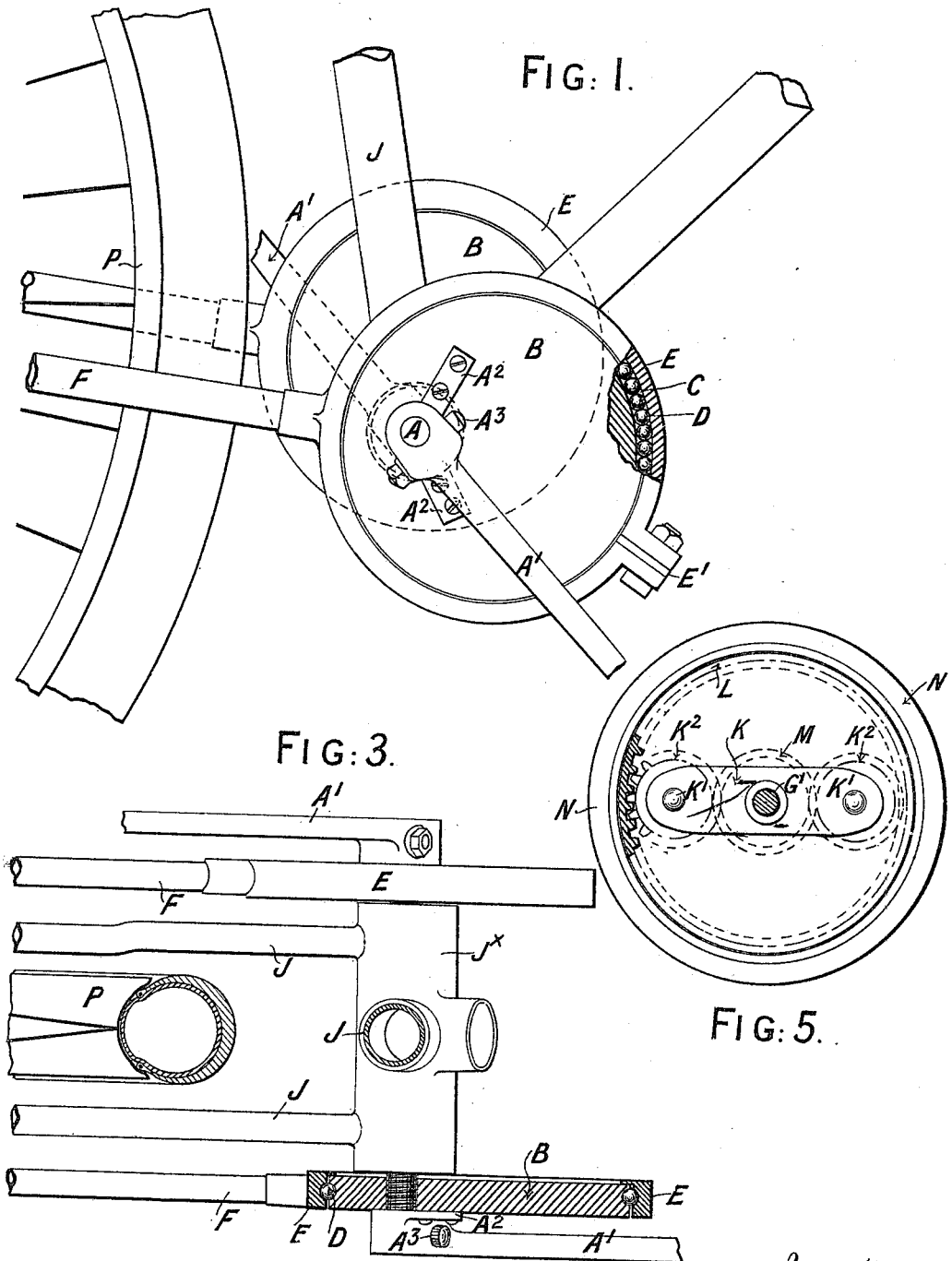

UNITED STATES PATENT OFFICE.

ARTHUR GOWER, OF EASTBOURNE, ENGLAND.

DRIVING-GEAR FOR BICYCLES.

SPECIFICATION forming part of Letters Patent No. 617,095, dated January 3, 1899.

Application filed December 29, 1897. Serial No. 664,341. (No model.)

*To all whom it may concern:*

Be it known that I, ARTHUR GOWER, a subject of the Queen of Great Britain, residing at Eastbourne, county of Sussex, England, have invented a new and useful Improvement in Driving-Gear for Bicycles, of which the following is a specification.

Letters Patent for this invention have been granted to me in Great Britain under date of January 2, 1897, No. 118.

My invention relates to an improved driving-gear for bicycles wherein a special form of epicycloidal gear is combined with actuating mechanism in an economical and compact arrangement to produce an efficient construction evenly balanced on the respective sides of the machine. I provide eccentrics upon the crank-shaft and operated by the pedals. The eccentrics actuate connecting-rods extending rearward and pivoted to cranks upon a central driving-shaft passing through the hub of the driving-wheel. This hub at one side is made with a flanged disk and provided with a central toothed wheel or gear. A fixed internal gear supported by the frame of the cycle fits within the flanged disk, and a crosshead secured to the central driving-shaft is provided with studs and pinions that mesh with the internal gear and central gear. By this device the speed of the driving-wheel is increased relatively to that of the driving-shaft.

In the drawings, Figure 1 is an elevation and partial section of the parts of the bicycle about the crank and eccentrics. Fig. 2 is an elevation of the parts about the center of the driving-wheel. Fig. 3 is a plan and partial section of the parts shown in Fig. 1. Fig. 4 is a plan and cross-section of the parts shown in Fig. 2, and Fig. 5 is an elevation and partial section of the gear around the center of the driving-wheel shaft.

Portions of the members of the frame of the bicycle are shown at J and the crank-shaft bracket at J$^\times$. The crank-shaft A passes through this bracket J$^\times$, and at either side I place eccentrics B, secured to the crank-shaft in any desirable manner. The periphery of each eccentric is provided with a groove, and a strap E surrounds each eccentric and is provided with an internal groove. These grooves or ball-races are indicated at C and the balls therein at D. The straps E are provided with connecting-flanges E', which are capable of adjustment to take up any slack from the wear of the parts.

In the construction shown the eccentrics B are screwed onto the shaft A, and the cranks A' are also screwed onto the shaft. The cranks are provided with arms A$^2$, secured by screws to the faces of the eccentrics B, so as to connect said parts, and the cranks are secured to the shaft A by cotter-pins A$^3$.

The connecting-rods F, secured to the straps E, extend rearward to connection with the cranks G, the rear ends of the connecting-rods having bearings F', through which the crank-pins of the cranks G pass, the cranks G being in turn secured to the respective ends of the central driving-shaft G', that passes through ball-bearings H in the frame of the machine and through other ball-bearings in the respective ends of the hub N of the driving-wheel P.

The hub N at one side is made with a flanged disk and is provided with a central toothed wheel or gear M, the tubular center of which gear is secured within the hub N. An internal gear L is connected to and supported by the frame of the cycle, and it fits within the recessed disk. Between these parts and rigidly secured to the central driving-shaft G is a cross-head K, in the respective ends of which are pivot-studs K', upon which are the pinions K$^2$. These pinions mesh, respectively, with the internal gear L and the central gear M.

In the operation of the device the rotation of the eccentrics B by means of the pedals and cranks imparts a reciprocating motion to the connecting-rods F and so turns the cranks G and rotates the shaft G'. The shaft G' carries with it the cross-head K, and the pinions revolve against the fixed gear L. These give motion to the central gear M and rotate the driving-wheel to propel the cycle in a forward direction.

The respective sizes of the pinions K$^2$, the internal gear L, and the central gear M may be varied as desired, so as to change the speed imparted to the driving-wheel in relation to the rotation of the eccentrics and the crank-shaft, it being presumed that the speed of the driving-wheel will in all cases be increased relatively to that of the driving-shaft.

In my improvement the length of the crank-shaft and the tread of the bicycle are not materially increased over the ordinary chain-wheel. The length of the driving-wheel hub is not materially increased, and the internal gear sets within the flange of the driving-wheel hub and effectually excludes the dust from the teeth of the gears and from the cross-head.

I claim as my invention—

1. In a cycle, the combination with the rear driving-wheel having a hub with a disk, rim and flange at one side and a central toothed wheel, of a central driving-shaft and ball-bearings therefor in the frame an internal gear supported by the frame and setting at its edge within the rim of the disk, a cross-head connected with the driving-shaft and pinions pivoted near the ends of the cross-head and meshing with the stationary internal gear and the central toothed wheel to drive the latter and the cycle-wheel, the gears being between the frame-bearings and within the flanged disk, substantially as specified.

2. In a cycle, the combination with the rear driving-wheel having a hub with a disk, rim and flange at one side and a central toothed wheel, of a central driving-shaft and ball-bearings therefor in the frame an internal gear supported by the frame and setting at its edge within the rim of the disk, a cross-head connected with the driving-shaft and pinions pivoted near the ends of the cross-head and meshing with the stationary internal gear and the central toothed wheel to drive the latter and the cycle-wheel, the gears being between the frame-bearings and within the flanged disk, cranks on the ends of the driving-shaft, connecting-rods therefrom and eccentric-straps on the forward ends of said rods, a crank-shaft, cranks and pedals and eccentrics fixed on the crank-shaft and within the straps and balls between the straps and eccentrics, substantially as specified.

ARTHUR GOWER.

Witnesses:
E. S. BREWER,
W. A. MARSHALL.